US012564205B2

(12) United States Patent
Hoogland et al.

(10) Patent No.: US 12,564,205 B2
(45) Date of Patent: Mar. 3, 2026

(54) PROCESS FOR PREPARING A HEAT-TREATED VEGETABLE AND/OR MEAT MATTER

(71) Applicant: Conopco, Inc., Englewood Cliffs, NJ (US)

(72) Inventors: Hans Hoogland, Wageningen (NL); Ana Balasa, Wageningen (NL)

(73) Assignee: Conopco Inc., Englewood Cliffs, NJ (US)

( * ) Notice: Subject to any disclaimer, the term of this patent is extended or adjusted under 35 U.S.C. 154(b) by 671 days.

(21) Appl. No.: 17/762,438

(22) PCT Filed: Sep. 14, 2020

(86) PCT No.: PCT/EP2020/075599
§ 371 (c)(1),
(2) Date: Mar. 22, 2022

(87) PCT Pub. No.: WO2021/063658
PCT Pub. Date: Apr. 8, 2021

(65) Prior Publication Data
US 2022/0400722 A1 Dec. 22, 2022

(30) Foreign Application Priority Data
Oct. 2, 2019 (EP) ..................................... 19201096

(51) Int. Cl.
| | |
|---|---|
| *A23L 19/00* | (2016.01) |
| *A23L 5/10* | (2016.01) |
| *A23L 13/20* | (2016.01) |
| *A23L 13/60* | (2016.01) |
| *A23L 19/10* | (2016.01) |
| *A23L 23/00* | (2016.01) |

(52) U.S. Cl.
CPC ................. *A23L 23/00* (2016.08); *A23L 5/13* (2016.08); *A23L 5/15* (2016.08); *A23L 13/20* (2016.08); *A23L 13/60* (2016.08); *A23L 19/09* (2016.08); *A23L 19/10* (2016.08); *A23V 2002/00* (2013.01)

(58) Field of Classification Search
None
See application file for complete search history.

(56) References Cited

U.S. PATENT DOCUMENTS

| | | |
|---|---|---|
| 3,672,908 A | 6/1972 | Hice, Sr. |
| 5,505,975 A | 4/1996 | Taylor |
| 2010/0026674 A1 | 2/2010 | Araki |
| 2017/0258103 A1 | 9/2017 | Mccloskey et al. |
| 2018/0007941 A1 | 1/2018 | Cully et al. |

FOREIGN PATENT DOCUMENTS

| | | |
|---|---|---|
| WO | 2020002121 A1 | 1/2020 |

*Primary Examiner* — Lien T Tran
(74) *Attorney, Agent, or Firm* — Ipsilon USA—NLO

(57) ABSTRACT
The invention provides process for preparing a heat-treated intermediate vegetable and/or meat matter preparation.

10 Claims, No Drawings

PROCESS FOR PREPARING A HEAT-TREATED VEGETABLE AND/OR MEAT MATTER

FIELD OF THE INVENTION

The invention relates to a process to prepare a heat-treated intermediate vegetable and/or meat matter preparation for use in industrial food production.

BACKGROUND OF THE INVENTION

Ready-to-eat products like meals, soups and sauces are products that only require heating before consumption. These products include stew, fried rice, curries, soups, (pasta) sauce like sauce bolognaise etc. They may be packaged in cans, jars or other packaging.

Many of these products like soups and sauces contain meat and vegetables. The industrial practice of preparing soups and sauces is relatively straight forward. It generally includes simply mixing meat and vegetables with the remaining food ingredients like spices, salt, flavour, thickeners, water to form the end-product like a sauce or soup and heating the mixture at about 70° C. followed by preservation and filling in suitable containers. In a domestic kitchen, normally raw meat and vegetables are used in the preparation of a soup or sauce. In contrast, to produce such ready-to-eat products in an industrial setting, usually meat and vegetables are pre-processed into what may be called an intermediate preparation before it is mixed with the remaining ingredients of the final food product e.g. a soup.

Intermediate ingredients in a food industrial setting refer to ingredients which have been processed but in general are not intended to be sold and consumed as such. In contrast, intermediate ingredients are designed to be used to formulate a so-called end-application, a soup, a sauce or a dish (ready-meal) like a stew that will be consumed as such.

However, the flavour is far from what we would expect from a home-cooked version, characterized by a roasted, aromatic flavour, i.e. a balance of sweet and fried vegetable and/or meat flavour. To improve the flavour of industrially prepared soups, a heat-treated intermediate vegetable and meat preparations can be made in a separate pre-process by heating vegetables and meat separately in a so called sofritto tank with a volume of typically 2500-3000 litres wherein 200 kg of vegetable and/or meat matter is heated at 95° C. for 15-30 minutes. Likewise, meat may be subject to a pre-process by heat treating meat matter. However, even with such a pre-processing, the result is typically only slightly better than the standard industrial soup prepared at 70° C., and often there is so little characteristic vegetable or meat flavour that it is necessary to add additional vegetable or meat flavour and/or aroma to such industrially prepared soups.

Industrial processing of meat and vegetables are known. For example, U.S. Pat. No. 3,672,908A discloses a method of heat processing food comprising the steps of:
- (a) placing the food to be processed in a processing zone;
- (b) surrounding the food in the zone with a gaseous atmosphere under elevated pressure prior to the application of heat to the food;
- (c) thereafter applying heat to the zone while maintaining the elevated pressure of said gaseous atmosphere until the food reaches a desired condition; and
- (d) thereafter relieving the pressure applied to the food and cooling the same.

The conditions of step (c) are carried out at temperatures not exceeding 225° F. (107° C.) at 70 psig (pounds per square inch gauge) in the examples.

U.S. Pat. No. 5,505,975A discloses a method in which meat such as poultry may be rapidly cooked in a closed and sealed pressure vessel subjected to a mixture of superheated steam and super-atmospheric compressed air at a temperature of least 400° F. (204.4° C.) and at an internal chamber pressure of at least 15 psig fed from an air compressor through a heat exchanger. Water is mixed with the heated super-atmospheric compressed air such that a mixture of superheated steam and super-atmospheric compressed air is created prior to mixture entry into the interior of the pressure vessel. Preferably, meat is cooked rapidly at a temperature within the chamber in the range of 400° F. to 600° F. (204.4° C. to 315.6° C.) and at pressures ranging from 15 to 150 psig. A pressure relief valve coupled to the pressure vessel exhausts the mixture of superheated steam and super-atmospheric compressed air to maintain the desired gas pressurization within the chamber.

None of the prior art process provide an intermediate meat or vegetable matter preparation that contributes a characteristic roasted, aromatic vegetable or meat flavour to the end product, e.g. a soup.

Therefore, there remains a need in the food industry for an improved process to provide a heat-treated intermediate vegetable matter preparation that has a delicious roasted, aromatic vegetable flavour. There also remains a need in the food industry for an improved process to provide a heat-treated intermediate meat matter preparation that has a delicious roasted, aromatic meat flavour.

In addition, it would be desirable to provide a heat-treated intermediate vegetable and/or meat matter preparation without unpleasant off-flavour (bitterness) of e.g. when the vegetables and/or meat are heated at high temperature in a retort.

SUMMARY OF THE INVENTION

According to the invention a process is provided for preparing a heat-treated intermediate vegetable and/or meat matter preparation comprising the steps of:
- a) Providing comminuted vegetable and/or meat matter;
- b) Optionally, admixing 0 to 100 parts by weight of a liquid phase to 100 parts of weight of comminuted vegetable and/or meat matter;
- c) Heating the comminuted vegetable and/or meat matter in a Heat Up Phase from 25° C. to 95% of the Holding Temperature in a Heat Up Time of less than 20 minutes, preferably less than 5 minutes; whereby the Holding Temperature is preferably of from 135° C. to 180° C., more preferably from more than 140° C. to 170° C., most preferably from 145° C. to 160° C.;
- d) Holding the comminuted vegetable and/or meat matter during the Holding Phase for a Holding Time at the Holding Temperature whereby the Holding phase corresponds to the Holding time and starts at 95% of the Holding Temperature and continues when the temperature increases up to the Holding Temperature and decreases thereafter to 95% of the Holding Temperature, and the Holding Time is from 10 seconds to 7 minutes, preferably 30 seconds to 6 minutes, more preferably 1 to 5 minutes, whereby the pressure during the Holding phase is at least the saturated vapor pressure of water and preferably the level of oxygen is at atmospheric oxygen levels;

e) Cooling the comminuted vegetable and/or meat matter after the Holding phase to a Filling Temperature, preferably less than 90° C., more preferably less than 80° C., most preferably less than 30° C., preferably in a Cooling Time of less than 20 minutes, preferably less than 15 minutes, more preferably less than 10 minutes, preferably between 5 seconds and 15 minutes, more preferably between 30 seconds and 10 minutes. to form the heat-treated intermediate vegetable and/or meat matter preparation;

f) Optionally, providing the heat-treated intermediate vegetable and/or meat matter preparation at Filling Temperature, preferably at atmospheric pressure, to process to prepare a food product;

g) Optionally, filling the heat-treated intermediate vegetable and/or meat matter preparation into a container at the Filling Temperature, preferably at atmospheric pressure.

The invention also provides a heat-treated intermediate vegetable and/or meat matter preparation as described below, a process to prepare a food composition comprising the step of adding a heat-treated intermediate vegetable and/or meat matter preparation prepared according to the invention in a process to prepare a food composition and a food composition comprising said heat-treated intermediate vegetable and/or meat matter preparation.

Surprisingly, the present invention provides a process suitable for industrial scale using very high temperatures whereby the heat-treated intermediate vegetable and/or meat matter preparation has a more intense flavour profile without undesirable off-flavour of vegetable and/or meat matter heated at high temperature. The flavour of the inventive heat-treated intermediate vegetable and/or meat matter preparation is so intense that it allows to decrease the amount of comminuted vegetable and/or meat matter, additional vegetable and/or meat matter aroma, salt and consequently the environmental resources. Advantageously, the heat-treated intermediate vegetable and/or meat matter preparation does not have a bitter off-flavour, associated with retort preparations of the prior art.

DETAILED DESCRIPTION OF THE INVENTION

The process according to the invention comprises a single heating step carried out under the conditions described herein. The single heating step has three consecutive phases: a Heat Up Phase, a Holding Phase at a Holding Temperature and a Cooling Phase. As known in the art of food processing, heating a product is a dynamic process and the temperature of the heating means may not correspond to the temperature of the food to be heated. For example, milk can be sterilised with steam injection. The temperature of the steam can be up to 160° C. However, to sterilise milk the steam injection only needs to heat the milk to 135° C. for 1-2 seconds. Thus, the food product is only heated to 135° C. while the steam is much hotter. In the present invention the temperature such as the Holding Temperature relates to the temperature of the vegetable and/or meat matter as measured with temperature probes inside the heating device.

In a first step of the invention, comminuted vegetable and/or meat matter is provided. This can be fresh or frozen vegetable and/or meat matter.

The comminuted vegetable matter is preferably selected from the group of root vegetables, curcurbits, capsicums, fungi. Preferably the comminuted vegetable matter does not consist of onion. Preferably, the comminuted vegetable matter comprises non-onion vegetable matter. By "non-onion" is meant that the vegetable matter does not consist of onion.

Preferably, the root vegetable is of carrot, sweet potato, celeriac, potato, parsnip or mixtures thereof.

Preferably, the cucurbit is butternut squash, pumpkin or courgette.

Preferably, the comminuted vegetable is selected from the group consisting of carrot, bell pepper, sweet potato, celeriac, celery, potato, parsnip, pumpkin, courgette, aubergine, mushroom and mixtures thereof, preferably the vegetable is selected from the group consisting of carrot, bell pepper and mushroom and mixtures thereof.

Preferably, the meat matter is selected from the group consisting of chicken, beef, pork, turkey, lamb, fish and mixtures thereof, preferably the meat matter is chicken. The meat matter is preferably selected from meat pieces and/or skin. The meat pieces are preferably chunks, diced, minced or ground meat matter. For example, the meat pieces are preferably chunks of beef, pork, turkey, lamb or fish. For instance, the meat pieces are preferably ground or minced chicken, beef, pork, turkey, lamb of fish. Preferably, the meat matter is chicken skin.

The comminuted vegetable and/or meat matter may be used as such or optionally admixed with a liquid phase in a w/w ratio of 0 to 100 parts by weight of a liquid phase to 100 parts of weight of comminuted vegetable and/or meat matter. The liquid phase may be water, oil and a mixture thereof. Any food grade oil may be used such as sunflower oil, olive oil, canola oil etc. Preferably, the ratio is 5 to 100 parts of liquid phase to 100 parts of comminuted vegetable and/or meat matter, more preferably from 10 to 100 parts of liquid phase to 100 parts of comminuted vegetable and/or meat matter. Whether the comminuted vegetable and/or meat matter is mixed with liquid phase or not it may also be referred to as "vegetable and/or meat matter preparation" for the present purpose. Depending on the desired flavour in the soup, sauce or dish (ready-meal) wherein the intermediate vegetable and/or meat matter preparation will be used, a skilled person may find it useful to add, for example, some ginger or spices like curry.

Preferably, the invention does not comprise a process, wherein 50 parts by weight of oil are admixed to 50 by weight of comminuted onion.

Preferably, the invention does not comprise a process wherein 50 parts by weight of water are admixed to 50 by weight of comminuted onion.

Preferably, the invention does not comprise a process wherein 4 parts by weight of oil and 22 parts by weight water are admixed to 74 parts by weight of comminuted onion.

The comminuted vegetable and/or meat matter is then heated in the Heat Up

Phase from ambient temperature (25° C.) to 95% of the Holding temperature. The corresponding Heat Up Time is the time needed to heat the comminuted vegetable and/or meat matter from 25° C. to 95% of the Holding temperature. The Heat Up Time is preferably less than 20 minutes, more preferably less than 8 minutes, even more preferably less than 5 minutes. The Holding Temperature is preferably from more than 135° C. to 180° C., more preferably from more than 140° C. to 170° C., even more preferably from 145° C. to 160° C.

Preferably, at least 50% of the comminuted vegetable and/or meat matter is retained by a sieve having a mesh size of 0.1 mm, more preferably wherein at least 60 wt.% of the comminuted vegetable and/or meat matter is retained by a sieve having a mesh size of 0.2 mm, even more preferably at least 70 wt.% of the comminuted vegetable and/or meat matter is retained by a sieve having a mesh size of 0.5 mm.

After the Heat Up Phase, the comminuted vegetable and/or meat matter is held during the Holding Phase for a Holding Time at the Holding Temperature. The Holding phase corresponds to the Holding time and starts at 95% of the Holding Temperature and continues when the temperature increases up to the Holding Temperature and decreases thereafter to 95% of the Holding Temperature. The Holding Time is preferably 10 seconds to 7 minutes, preferably 30 seconds to 6 minutes, more preferably 1 to 5 minutes such that the comminuted vegetable and/or meat matter is cooked whereby the pressure during the Holding phase is at least the saturated vapour pressure of water (corresponding to 0.36 to 1.0 MPa gauge). Preferably the level of oxygen is at atmospheric oxygen levels. The Holding phase ends when the subsequent Cooling phase starts. Preferably, the heating treatment is such that the comminuted vegetable and/or meat matter is completely sterilised.

The Cooling Phase corresponds to the Cooling Time which starts when the temperature has returned to 95% of the Holding Temperature and stops at the Filling Temperature. The Filling Temperature is preferably less than 90° C., more preferably less than 80° C., most preferably less than 30° C., preferably between 10° C. and 90° C., more preferably between 10° C. and 80° C. and most preferably between 10° C. and 30° C. The Cooling Time is preferably less than 20 minutes, preferably less than 15 minutes, more preferably less than 10 minutes, preferably between 5 seconds and 15 minutes, more preferably between 30 seconds and 10 minutes.

The Filling Temperature depends on how the heat-treated intermediate vegetable and/or meat matter preparation is used. Advantageously, the heat-treated intermediate vegetable and/or meat matter preparation can be added at Filling Temperature to a process to prepare a food product like a soup or sauce. For example, the cooled heat-treated intermediate vegetable and/or meat matter preparation may be transported through a pipe and added directly in a vessel with the remaining ingredients of a soup or sauce wherein the soup or sauce is normally prepared. In that case the Filling Temperature may be about 72° C. or higher if it is desired that the heat-treated intermediate vegetable and/or meat matter preparation is to remain aseptic. Preferably, the addition of the heat-treated intermediate vegetable and/or meat matter preparation is carried out at atmospheric pressure.

It may also be desirable to prepare the heat-treated intermediate vegetable and/or meat matter preparation at a different time or location than the production of the food product like a soup or sauce. Then the heat-treated intermediate vegetable and/or meat matter preparation may also be filled into a container at the Filling Temperature and stored before being used, e.g. in an aseptic bag in box to store it at ambient temperatures. Filing is preferably at atmospheric pressure.

Thus, after the Holding Phase, the comminuted vegetable and/or meat matter is cooled to the Filling Temperature for a Cooling Time as described above to form the heat-treated intermediate vegetable and/or meat matter preparation.

Preferably the vegetable and/or meat matter is heated using ohmic heating, microwave heating, steam injection heating or thermal conductive and/or convective heating.

Preferably, the inventive process does not comprise a step whereby the vegetable and/or meat matter is heated in an open system to reduce the amount of intermediate vegetable and/or meat matter preparation to less than 65% of its weight when compared to the weight of the intermediate vegetable and/or meat matter preparation before the heating in the open system. Heating in an open system is a heating step in an open container, which allows water to be evaporated thereby reducing the weight of the intermediate vegetable and/or meat matter preparation like heating in open frying pan over moderate heat. Preferably, the inventive process does not comprise a step whereby the vegetable and/or meat matter is heated in an open system at a temperature of from 80° C. to 100° C. for 3 to 30 minutes. Preferably, the inventive process does not comprise a step whereby the vegetable and/or meat matter is heated in open system at a temperature of from 80° C. to 100° C. for 3 to 30 minutes, thereby reducing the amount of intermediate vegetable and/or meat matter preparation to less than 65% of its weight when compared to the weight of the intermediate vegetable and/or meat matter preparation before the heating in the open system. In contrast, the process according to the invention is normally carried out whereby no substantial amounts of water are evaporated.

Process Equipment

While the applicants did not use a standard retort to carry out the invention using the combination of specific parameters, other standard equipment can be used. The present invention has the advantage that a skilled person—with the knowledge of the required process parameters of the invention—can select appropriate equipment from standard food industry appliances to carry out the invention. The invention can be used in conjunction with standard processing lines without the need for personnel to work at supra-atmospheric pressures.

The process according to the invention can be applied in batch or continuous mode. One example of a batch mode was used for Examples 1 through 4 below when applicants used a steel tube of 10 mm inner diameter and 12 mm outer diameter and about 15-20 cm long which was immersed in oil at the Holding Temperature. The cooling was carried out by taking the tube out the hot oil and cooling it in water to the Filling Temperature. Such a relatively small set up can be used when only small volumes are needed. In continuous mode, the process according to invention may be carried out in suitable heat exchangers capable of reaching the combination of the short Heat-Up Time and the high Holding Temperature. These include scraped surface heat exchangers, Tube in Tube in Tube, Annular Tube Tube, Shell and tube exchanger, spiral heat exchanger. Preferably, the vegetable and/or meat matter is heated in a tube in tube in tube heat exchanger, a tubular heat exchanger, helical coil heat exchanger or in a scraped surface heat-exchanger. Such heat exchangers are for example available from Alva Laval. Preferably, in the process according to the invention the vegetable and/or meat matter is heated in a Tube in Tube in Tube, Annular Tube Tube, Shell and tube exchanger, spiral heat exchanger having a hydraulic diameter of from 0.1 to 10 cm, preferably from 0.4 to 5 cm, more preferably of from 0.6 to 3 cm.

The hydraulic diameter, $D_H$, is a commonly used term when handling flow in non-circular tubes and channels. It is defined as:

$$D_H = \frac{4A}{P}$$

Where

A is the cross-sectional area,

P is the wetted perimeter of the cross-section

For example for a circular tube: $D_H$=D (wherein D is the tube diameter).

For an annulus: $D_H$=$D_{out}$–$D_{in}$ (whereby $D_{in}$ represents the diameter of the inner tube; $D_{out}$ represents the diameter of the outer tube)

Preferably, in the process according to the invention the vegetable and/or meat matter is heated in a Tube in Tube in Tube, Annular Tube Tube, Shell and tube exchanger, spiral heat exchanger having a hydraulic diameter of from 0.1 to 10 cm, preferably from 0.4 to 5 cm, more preferably of from 0.6 to 3 cm and the particle size (cm) of the comminuted vegetable and/or meat matter is preferably in the range of 0.2*hydraulic diameter, $D_H$, to 0.5*hydraulic diameter, $D_H$, more preferably 0.25*hydraulic diameter, $D_H$, to 0.35*hydraulic diameter $D_H$.

Preferably, in the process according to the invention the comminuted vegetable and/or meat matter is heated through ohmic or microwave heating. Without wishing to be bound by theory, heating through ohmic or microwave heating heats homogeneously throughout the comminuted vegetable and/or meat matter.

Without wishing to be bound by theory it is thought that the combination of the short Heat Up Time and the short Holding Time at the relatively high Holding temperature results in the unexpected advantages, such as providing a strong roasted, aromatic vegetable and or meat flavour. Using standard industrial retorts this combination is not known. While heating at temperatures of 140 to 180° C. can be achieved in e.g. a retort under pressure, the heat-up time of a retort to reach 120° C. is at least 50 minutes. A domestic pressure cooker is not designed to reach temperatures higher than 115 or 117° C.

Preferably, the vegetable and/or meat matter processed according to the invention has a chemical change (C) of more than 1 (C>1), as calculated according to formula (1):

$$C^{**}=10^{\wedge}((T-T_{ref})/Z) \times (t/60),$$

Where:

$T_{ref}$=the reference temperature (150° C.)

T=the processing temperature (° C.)

t=the holding time (seconds)

Z=22.5° C.

Preferably, the vegetable and/or meat matter subjected to the process as defined herein has a C** of more than 1, preferably more than 2, even more preferably more than 5.

For a typical UHT process not according to the present invention, the chemical change (C**) is less than one.

Preferably, there is provided a process for preparing a heat-treated intermediate vegetable and/or meat matter preparation comprising the steps of:

a) providing comminuted vegetable matter being selected from the group consisting of carrot, bell pepper mushroom and mixtures thereof, b) admixing 1 to 100 parts by weight of a liquid phase to 100 parts of weight of comminuted vegetable, c) heating the comminuted vegetable matter in a Heat Up Phase from 25° C. to 95% of the Holding Temperature in a Heat Up Time of less than 5 minutes; whereby the Holding Temperature is preferably from more than 140° C. to 170° C., d) holding the comminuted vegetable matter during the Holding Phase for a Holding Time at the Holding Temperature whereby the Holding phase corresponds to the Holding time and starts at 95% of the Holding Temperature and continues when the temperature increases up to the Holding Temperature and decreases thereafter to 95% of the Holding Temperature, and the Holding Time is from 10 seconds to 7 minutes, preferably 30 seconds to 6 minutes, more preferably 1 to 5 minutes, whereby the pressure during the Holding phase is at least the saturated vapor pressure of water and preferably the level of oxygen is at atmospheric oxygen levels, e) cooling the comminuted vegetable matter after the Holding phase to a Filling Temperature, preferably less than 90° C., more preferably less than 80° C., most preferably less than 30° C., preferably in a Cooling Time of between 5 seconds and 10 minutes to form the heat-treated intermediate vegetable matter preparation, f) providing the heat-treated intermediate vegetable matter preparation at Filling Temperature, preferably at atmospheric pressure, to process to prepare a food product;

g) filling the heat-treated intermediate vegetable matter preparation into a container at the Filling Temperature, preferably at atmospheric pressure.

Preferably, there is provided a process for preparing a heat-treated intermediate vegetable and/or meat matter preparation comprising the steps of:

a) providing comminuted vegetable and/or meat matter being selected from the group consisting of carrot, bell pepper mushroom and chicken and mixtures thereof, b) admixing 0 to 100 parts by weight of a liquid phase to 100 parts of weight of comminuted vegetable and/or meat matter, c) heating the comminuted vegetable and/or meat matter in a Heat Up Phase from 25° C. to 95% of the Holding Temperature in a Heat Up Time of less than 5 minutes; whereby the Holding Temperature is preferably from more than 140° C. to 170° C., d) holding the comminuted vegetable and/or meat matter during the Holding Phase for a Holding Time at the Holding Temperature whereby the Holding phase corresponds to the Holding time and starts at 95% of the Holding Temperature and continues when the temperature increases up to the Holding Temperature and decreases thereafter to 95% of the Holding Temperature, and the Holding Time is from 10 seconds to 7 minutes, preferably 30 seconds to 6 minutes, more preferably 1 to 5 minutes, whereby the pressure during the Holding phase is at least the saturated vapor pressure of water and preferably the level of oxygen is at atmospheric oxygen levels, e) cooling the comminuted vegetable and/or meat matter after the Holding phase to a Filling Temperature, preferably less than 90° C., more preferably less than 80° C., most preferably less than 30° C., preferably in a Cooling Time of between 5 seconds and 10 minutes to form the heat-treated intermediate vegetable and/or meat matter preparation, f) providing the heat-treated intermediate vegetable and/or meat matter preparation at Filling Temperature, preferably at atmospheric pressure, to process to prepare a food product;

g) filling the heat-treated intermediate vegetable and/or meat matter preparation into a container at the Filling Temperature, preferably at atmospheric pressure.

Heat-Treated Intermediate Vegetable and/or Meat
Matter Preparation

The inventive heat-treated intermediate vegetable and/or meat matter preparation as prepared in the examples had a soft appearance, almost resembling a paste, although distinct vegetable and/or meat matter pieces were still visible. The heat-treated intermediate vegetable and/or meat matter preparation has a roasted, aromatic flavour. The inventive heat-treated intermediate vegetable and/or meat matter lacks a bitter taste.

The ingredients and amounts described for the process apply mutatis mutandis to the heat-treated intermediate vegetable and/or meat matter preparation, and to a food composition comprising a heat-treated intermediate vegetable and/or meat matter preparation.

The invention provides a food composition comprising a heat-treated intermediate vegetable and/or meat matter preparation prepared according to the invention preferably in an amount of 0.1 to 50 wt. % by weight of the total food composition, preferably the food composition is a soup, a sauce or a ready-meal. Within the context of the present application, a ready-meal is a food product eaten as such or a kit from which a consumer (simply) prepares a meal.

The invention also provides a process for preparing a food composition comprising the step of adding a heat-treated intermediate vegetable and/or meat matter preparation prepared according to the invention in a process to prepare a food composition, preferably in an amount of 0.1 to 50 wt. % by weight of the total food composition, preferably the food composition is a soup, a sauce or a ready-meal.

The inventions also provides a process for preparing a food composition wherein the vegetable matter does not consist of onion, preferably wherein the vegetable matter does not consist of 50 wt. % onion and 50 wt. % oil; 50 wt. % onion and 50 wt. % water; or 74 wt. % onion, 4 wt. % oil and 22 wt. % water.

The invention is further illustrated by the following non-limiting examples. It will be clear to the skilled person how to carry out the invention by using equivalent means without departing from the invention.

EXAMPLES

Raw Materials

Vegetable used in the following examples were:
    "Bell Pepper"—88 wt. % Bell pepper, 12 wt. % rapeseed oil.
    "Carrot"—80 wt. % carrot, 12 wt. % rapeseed oil, 8 wt. % water.
    "Mushroom"—90 wt. % mushroom, 10 wt. % rapeseed oil
Meat material used in the following examples was:
    "Chicken skin"—100 wt. % chicken skin The raw materials—purchased in the Netherlands and EU—were heated according to the parameters detailed below to prepare intermediate vegetable or meat matter preparations.

The intermediate vegetable or meat matter preparations were combined with a model base soup composition to provide a food composition.

General preparation of model soup:
    As a model soup base, commercial vegetable bouillon from Knorr was chosen (Knorr "Vegetable bouillon"). One cube of bouillon was dissolved in one litre of water at 95° C. The bouillon was filtered through a sieve to remove any residual solid pieces. Each set of samples (bell pepper, carrots, mushrooms and chicken skin) were evaluated in a separate session. The tasters were asked to rate the model soups on the strength of the roasted, aromatic flavour of the vegetable or meat: (–): complete lack of roasted/aromatic flavour; (–/+) neutral flavour; (+) . . . (++++) roasted/aromatic flavour (scale ++++ most dominant)).

Example 1—Bell Pepper

TABLE 1

| No | Sample prepared in | Taste of ingredient | Taste of model soup |
|----|--------------------|--------------------|--------------------|
| 1 | Pan (160° C., 10 minutes) | – | – |
| 2 | Oven (200° C., 5 minutes, 1 bar) | – | – |
| 3 | Sterilization (121° C., 3 minutes) | – | – |
| 4 | Pressure + heat (106° C., 3 Bar, 16 minutes) | – | – |
| 5 | HTC [1] (140° C., 6 minutes) | +++ | +++ |
| 6 | HTC [2] (150° C., 5 minutes) | ++++ | +++ |
| 7 | HTC [3] (170° C., 20 seconds) | ++++ | +++ |

[1] Heat up time was 4 minutes and 30 seconds, holding time was 6 minutes, cooling time was 1 minute and the cooling temperature was 50° C.

[2] Heat up time was 3:30 minutes, holding time was 5:00 minutes, cooling time was 1:30 minute and the cooling temperature was 40° C.

[3] Heat up time was 4 minutes, holding time was 20 seconds, cooling time was 1 minute and the cooling temperature was 40° C.

For the soup, 10 g of bell pepper was added to 90 g of soup base.

Example 2—Carrot

TABLE 2

| | Carrot | | |
|----|--------------------|--------------------|--------------------|
| No | Sample prepared in | Taste of ingredient | Taste of model soup |
| 1 | Pan (160° C., 10 minutes) | –/+ | –/+ |
| 2 | Oven (200° C., 5 minutes, 1 bar) | – | – |
| 3 | Sterilization (121° C., 3 minutes) | – | – |
| 4 | Pressure + heat (107° C., 3 Bar, 18 minutes) | – | – |
| 5 | HTC [1] (140° C., 6 minutes) | + + | + + |
| 6 | HTC [2] (150° C., 6 minutes) | + + + | + + + |
| 7 | HTC [3] (170° C., 80 seconds) | + + | + + |

[1] Heat up time was 3 minutes, holding time was 6 minutes, cooling time was 2 minutes and the cooling temperature was 30° C.

[2] Heat up time was 3 minutes, holding time was 6 minutes, cooling time was 2 minutes and the cooling temperature was 40° C.

[3] Heat up time was 2 minutes and 30 seconds, holding time was 1 minute and 20 seconds, cooling time was 1 minute and 20 seconds and the cooling temperature was 50° C.

Preparation of model soup as above. 8 g of carrot sample was combined with 18.7 g of soup solution (30 wt. % carrot) and then tasted on a spoon while keeping the solution warm.

Example 3—Mushroom

TABLE 3

| | | Taste of | Taste of |
| No | Sample prepared in | ingredient | model soup |
| --- | --- | --- | --- |
| | | Mushroom | |
| 1 | Pan<br>(160° C., 9 minutes) | − | − |
| 2 | Oven<br>(200° C., 5 minutes, 1 bar) | − | − |
| 3 | Sterilization<br>(121° C., 3 minutes) | − | − |
| 4 | Pressure + heat<br>(106° C., 3 Bar, 17 minutes) | − | − |
| 5 | HTC<br>(140° C., 6:30 minutes)[1] | + | + + |
| 6 | HTC<br>(150° C., 5 minutes) [2] | + + | + + + |
| 7 | HTC<br>(170° C., 90 seconds)[3] | + + + | + |

[1]Heat up time was 3 minutes, holding time was 6 minutes and 30 seconds, cooling time was 2 minutes and 30 seconds and the cooling temperature was 40° C.
[2] Heat up time was 3 minutes and 20 seconds, holding time was 5 minutes, cooling time was 1 minute and 20 seconds and the cooling temperature was 45° C.
[3]Heat up time was 3 minutes, holding time was 1 minute and 30 seconds, cooling time was 2 minutes and the cooling temperature was 35° C.

8 g of mushroom sample was suspended in 18.7 g of soup solution (30 wt. % mushroom) and then tasted on a spoon while keeping the solution warm.

Example 4—Chicken Skin

The aroma characteristics of each sample were assayed.

TABLE 4

| | | aroma of heated | Taste of |
| No | Sample prepared in | ingredient | model soup |
| --- | --- | --- | --- |
| | | Chicken skin | |
| 1 | Pan<br>(160° C., 11 minutes) | − | − |
| 2 | Oven<br>(200° C., 5 minutes, 1 bar) | − | − |
| 3 | Sterilization<br>(121° C., 3 minutes) | − | − |
| 4 | Pressure + heat<br>(106° C., 3 Bar, 17 minutes) | − | − |
| 5 | HTC [1]<br>(140° C., 7 minutes) | + + | + + |
| 6 | HTC [2]<br>(150° C., 5 minutes) | + + + | + + + |
| 7 | HTC [3]<br>(170° C., 100 seconds) | + + + + | + + + + |

[1] Heat up time was 2 minutes, holding time was 7 minutes, cooling time was 2 minutes and the cooling temperature was 30° C.
[2] Heat up time was 3 minutes and 20 seconds, holding time was 5 minutes, cooling time was 2 minutes and the cooling temperature was 30° C.
[3] Heat up time was 2 minutes and 30 seconds, holding time was 1 minute and 40 seconds, cooling time was 1 minute and the cooling temperature was 50° C.

8 g of chicken sample (6 g solids, 2 g rendered fat) was suspended in 12 g of soup solution (40 wt.% chicken) and then tasted on a spoon while keeping the solution warm.

The invention claimed is:

1. A process for preparing a heat-treated intermediate vegetable and/or meat matter preparation comprising the steps of:
 a) providing comminuted vegetable and/or meat matter,
 b) admixing 0 to 100 parts by weight of a liquid phase to 100 parts of weight of the comminuted vegetable and/or meat matter of step a), c) subjecting the comminuted vegetable and/or meat matter of step b) to a single heating step having three consecutive phases:
  i) Heating the comminuted vegetable and/or meat matter in a Heat Up Phase from 25° C. to 95% of a Holding Temperature, whereby the Holding Temperature is from 135° C. to 180° C., in a Heat Up Time of less than 20 minutes and at least 2 minutes;
  ii) Holding the comminuted vegetable and/or meat matter during a Holding Phase for a Holding Time at the Holding Temperature, whereby the Holding phase corresponds to the Holding time and starts when the comminuted vegetable and/or meat matter reaches a temperature of 95% of the Holding Temperature according to step (i), during the Holding phase the comminuted vegetable and/or meat matter at from step (i) is heated from 95% of the Holding Temperature up to the Holding Temperature and whereby thereafter the temperature is decreased again to 95% of the Holding Temperature, and whereby the Holding Time is from 10 seconds to 7 minutes, whereby a pressure during the Holding phase is corresponding to 0.36 to 1.0 MPa gauge and a level of oxygen is at atmospheric oxygen levels,
  iii) cooling the comminuted vegetable and/or meat matter after the Holding phase to a Filling Temperature of less than 90° C. in a Cooling Time of less than 20 minutes, to form the heat-treated intermediate vegetable and/or meat matter preparation,
 d) optionally, providing the heat-treated intermediate vegetable and/or meat matter preparation at a Filling Temperature, at atmospheric pressure, to prepare a food product;
 e) optionally, filling the heat-treated intermediate vegetable and/or meat matter preparation into a container at the Filling Temperature, at atmospheric pressure;
 and wherein in step c) the vegetable and/or meat matter is heated in a tube having a hydraulic diameter of from 0.1 to 10 cm.

2. The process according to claim 1 whereby step b) comprises admixing 0 to 50 parts by weight of a liquid phase to 100 parts of weight of said comminuted vegetable and/or meat matter.

3. The process according to claim 1 wherein the vegetable and/or meat matter is heated in a batch or continuous process.

4. The process according to claim 1, wherein the vegetable and/or meat matter is heated using ohmic heating, steam injection heating thermal conductive and/or convective heating.

5. The process according to claim 1, wherein the comminuted vegetable and/or meat matter is heated in a tube-in-tube-in-tube heat exchanger, a tubular heat exchanger or a scraped surface heat-exchanger.

6. The process according to any one of the preceding claims, wherein the vegetable is selected from the group consisting of carrot, pepper, sweet potato, celeriac, celery, potato, parsnip, pumpkin, courgette, aubergine, mushrooms (fungi), and mixtures thereof.

7. The process according to claim 1 wherein the meat matter is selected from the group consisting of chicken, beef, pork, turkey, lamb, fish and mixtures thereof.

8. The process according to claim 1 wherein at least 50% of the vegetable and/or meat matter is retained by a sieve having a mesh size of 0.1 mm.

9. The process according to claim 1, wherein the heat-treated intermediate vegetable and/or meat matter preparation has a chemical change (C) of more than 1, wherein the chemical change C is calculated according to C**=10^((T−T$_{ref}$)/Z)×(t/60), wherein T$_{ref}$ corresponds to a reference temperature of 150° C., T corresponds to the Holding Temperature in ° C., t corresponds to the Holding Time in seconds, and Z corresponds to 22.5° C.

10. The process of claim 1, wherein in the single heating step of step (c) the comminuted vegetable and/or meat matter is heated through ohmic or microwave heating.

\* \* \* \* \*